United States Patent
Wang et al.

(10) Patent No.: US 10,051,424 B2
(45) Date of Patent: *Aug. 14, 2018

(54) POSITIONING SYSTEMS AND METHODS FOR DETERMINING THE LOCATION OF A MOBILE COMMUNICATION DEVICE

(71) Applicant: Telefonaktiebolaget L M Ericsson (publ), Stockholm (SE)

(72) Inventors: Meng Wang, Sundbyberg (SE); Torbjörn Wigren, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/758,677

(22) PCT Filed: Jun. 22, 2015

(86) PCT No.: PCT/SE2015/050720
§ 371 (c)(1),
(2) Date: Jun. 30, 2015

(87) PCT Pub. No.: WO2016/122365
PCT Pub. Date: Aug. 4, 2016

(65) Prior Publication Data
US 2016/0360369 A1  Dec. 8, 2016

Related U.S. Application Data

(63) Continuation-in-part of application No. 14/606,287, filed on Jan. 27, 2015.
(Continued)

(51) Int. Cl.
*H04W 4/02* (2018.01)
*H04W 24/08* (2009.01)
(Continued)

(52) U.S. Cl.
CPC ............ *H04W 4/025* (2013.01); *G01S 5/02* (2013.01); *G01S 5/0221* (2013.01);
(Continued)

(58) Field of Classification Search
CPC ........ H04W 4/025; H04W 24/08; G01S 11/06
(Continued)

(56) References Cited

U.S. PATENT DOCUMENTS 6,834,180 B1 * 12/2004 Marshall ............... H04W 24/00
455/422.1
8,081,923 B1 * 12/2011 Larsen .................... G01S 5/021
455/18
(Continued)

FOREIGN PATENT DOCUMENTS

| EP | 1448008 A1 | 8/2004 |
|---|---|---|
| EP | 1487223 A1 | 12/2004 |

(Continued)

OTHER PUBLICATIONS

"3rd Generation Partnership Project; Technical Specification Group Radio Access Network; Evolved Universal Terrestrial Radio Access (E-UTRA); LTE Positioning Protocol (LPP) (Release 12)," 3GPP TS 36.355, V12.4.0, Mar. 2015, 126 pages.
(Continued)

*Primary Examiner* — Kamran Afshar
*Assistant Examiner* — Nicole Louis-Fils
(74) *Attorney, Agent, or Firm* — Rothwell, Figg, Ernst & Manbeck, p.c.

(57) ABSTRACT

A localization approach based on cable length detection. In one aspect, a method performed by a positioning system for determining the location of a mobile communication device (MCD) is provided. In some embodiments, the method includes the positioning system determining a cable length value representative of the length of the cable connecting a
(Continued)

base station to a radio head serving the MCD. The positioning system then determines a location of the MCD based on the determined cable length.

26 Claims, 12 Drawing Sheets

Related U.S. Application Data

(60) Provisional application No. 62/121,061, filed on Feb. 26, 2015.

(51) Int. Cl.
| | |
|---|---|
| *G01S 11/06* | (2006.01) |
| *G01S 5/02* | (2010.01) |
| *H04W 64/00* | (2009.01) |
| *H04W 4/90* | (2018.01) |
| *H04W 88/08* | (2009.01) |
| *H04W 4/22* | (2009.01) |

(52) U.S. Cl.
CPC ............. *G01S 5/0252* (2013.01); *H04W 4/02* (2013.01); *H04W 24/08* (2013.01); *H04W 64/00* (2013.01); *G01S 11/06* (2013.01); *H04W 4/22* (2013.01); *H04W 4/90* (2018.02); *H04W 88/085* (2013.01)

(58) Field of Classification Search
USPC .............................................. 455/456.1–457
See application file for complete search history.

(56) References Cited

U.S. PATENT DOCUMENTS

| | | | |
|---|---|---|---|
| 2002/0145968 A1 | 10/2002 | Zhang et al. | |
| 2003/0050878 A1* | 3/2003 | Rappaport | G06Q 30/04 705/34 |
| 2003/0216143 A1 | 11/2003 | Roese et al. | |
| 2003/0217151 A1 | 11/2003 | Roese et al. | |
| 2005/0130669 A1 | 6/2005 | Mizugaki et al. | |
| 2005/0267677 A1* | 12/2005 | Poykko | G01S 5/0252 701/408 |
| 2006/0251115 A1 | 11/2006 | Haque et al. | |
| 2008/0119208 A1 | 5/2008 | Flanagan et al. | |
| 2011/0286437 A1* | 11/2011 | Austin | H04W 4/02 370/338 |
| 2012/0281565 A1 | 11/2012 | Sauer et al. | |
| 2013/0252629 A1* | 9/2013 | Wigren | H04W 64/00 455/456.1 |
| 2014/0120947 A1* | 5/2014 | Siomina | H04W 4/001 455/456.1 |
| 2014/0241185 A1 | 8/2014 | Yanover et al. | |
| 2015/0244562 A1* | 8/2015 | Hanson | H04L 41/06 370/242 |
| 2016/0219396 A1 | 7/2016 | Wigren et al. | |
| 2016/0381654 A1 | 12/2016 | Wigren | |

FOREIGN PATENT DOCUMENTS

| | | |
|---|---|---|
| WO | 2004/023155 A1 | 3/2004 |
| WO | 2005032202 A1 | 4/2005 |
| WO | 2005039214 A1 | 4/2005 |
| WO | 2014064656 A2 | 5/2014 |
| WO | 2016122364 A1 | 8/2016 |

OTHER PUBLICATIONS

"3rd Generation Partnership Project; Technical Specification Group Radio Access Network; Evolved Universal Terrestrial Radio Access (E-UTRA); LTE Positioning Protocol (LPPa) (Release 12)," 3GPP TS 36.455, V12.2.0, Mar. 2015, 62 pages.
3rd Generation Partnership Project; Technical Specification Group Radio Access Network; Evolved Universal Terrestrial Radio Access (E-UTRA); Radio Resource Control (RRC) Protocol specification (Release 12), 3GPP TS 36.331 V12.5.0, Mar. 2015, 445 pages.
International Search Report and Written Opinion dated Sep. 11, 2015 in International application No. PCT/SE2015/050136, 9 pages.
Office Action issued in U.S. Appl. No. 14,606,287 dated May 9, 2016, 41 pages.
International Search Report dated Mar. 11, 2016, issued for application No. PCT/SE2015/051323, 5 pages.
Office action issued in related U.S. Appl. No. 14/606,287, dated Jan. 8, 2016, 36 pages.
Wigren., T., "Adaptive Enhanced Cell-ID Fingerpringting Localization by Clustering of Precise Position Measurements," IEE Transactions on Vehicular Technology vol. 56, No. 5, Sep. 2007, 11 pages.
International Search Report and Written Opinion issued in corresponding International application No. PCT/SE2015/050720 dated, dated Feb. 15, 2016.
Non-Final Office Action issued in U.S. Appl. No. 14/902,189, dated Feb. 1, 2017, 45 pages.
Non-Final Office Action dated Dec. 28, 2016, issued for U.S. Appl. No. 14/606,287, 16 pages.
Final Office Action issued in U.S. Appl. No. 14/606,237, dated Jun. 1, 2017, 33 pages.
Notice of Allowance issued in U.S. Appl. No. 14/902,139, dated Jun. 1, 2017, 14 pages.
Non-Final Office Action issued in U.S. Appl. No. 14/606,287, dated Nov. 15, 2017, 20 pages.
Supplementary European Search Report in EP 15 88 0332 dated May 24, 2018, 6 pages.

* cited by examiner ns via the cable. In the downlink, each such radio head transmits with a maximum power of 100 mW. Power amplifiers are located in the radio head.

POSITIONING SYSTEMS AND METHODS FOR DETERMINING THE LOCATION OF A MOBILE COMMUNICATION DEVICE

CROSS REFERENCE TO RELATED APPLICATION(S)

This application is a 35 U.S.C. § 371 National Phase Entry Application from PCT/SE2015/050720, filed Jun. 22, 2015, which claims priority to: 1) U.S. Application Number 14/606,287, filed Jan. 27, 2015 and 2) U.S. Application Number 62/121,061, filed on Feb. 26, 2015. The above identified applications are incorporated by reference.

TECHNICAL FIELD

This disclosure relates to determining the location of a mobile communication device.

BACKGROUND

A cellular communication system comprises a number of base stations, each of which uses one or more antenna elements to serve one or more cells (geographic regions). The base station functions to communicate with mobile communication devices (MCDs) (e.g., smartphones, tables, phablets, etc.) to provide the MCD with access to a network (e.g., the Internet or other network). A base station typically includes at least an antenna element, a radio unit (RU) and a digital unit (DU). An RU typically includes a receiver and a transmitter in order to transmit data to and receive data from an MCD.

The signal transmitted by a base station may be received by an MCD with poor quality when the MCD is in certain locations. For example, when an MCD is located inside of a building (e.g., an office building, a home) and the base station antenna that is serving the MCD is located outside of the building, the MCD may not receive a strong signal from the antenna. Likewise, in such a situation, in order for the MCD to transmit a signal to the base station, the MCD may have transmit the signal using more power than the MCD would have had to use had the MCD been located outdoors. Such a situation reduces the MCD's battery life.

A solution to this problem is to install small transceiver units (a.k.a., "radio heads") indoors and connect each of the radio heads to an RU of a base station using a cable (e.g., local area network (LAN) cable, such as an Ethernet cable). For example, in a large building with poor network coverage, a radio head connected via a cable to an RU may be placed on each floor of the building. Such a radio head receives via the cable a signal transmitted from the RU and then retransmits the signal wirelessly so that the signal will be received with good quality by an MCD located in the vicinity of the radio head. Likewise, when the MCD transmits a wireless signal, the signal is picked up by the radio head in the vicinity of the MCD and retransmitted by the radio head to the RU via the cable. In this way, a base station can provide good indoor coverage. Accordingly, radio heads include one or more antenna elements for broadcasting and receiving wireless signals, and radio heads may also include amplifiers so that a received signal (e.g., a signal from an RU or a wireless signal from an MCD) can be amplified before it is retransmitted.

One such commercial solution is the Ericsson "Radio Dot System" (RDS). In an RDS, multiple (e.g., one to eight) radio heads are each connected to an RU via an Ethernet cable. The radio heads receive power as well as the communication signals via the cable. In the downlink, each such radio head transmits with a maximum power of 100 mW. Power amplifiers are located in the radio head.

Emergency positioning needs (e.g., E-911) and other location services (LCS) require the position of an MCD to be determined within certain horizontal and vertical accuracies. For example, emergency position requirements may require horizontal inaccuracy to be below 50 meters. Additionally, the vertical inaccuracy requirement has recently been tightened to 3 meters in North America in order to better distinguish between floors in buildings.

Accordingly, there is a need for an improved system for determining the location of an MCD.

SUMMARY

The fulfillment of emergency positioning requirements when an MCD is located indoors remains a challenging problem. For example, satellite positioning is not always available indoors. Additionally, cell ID positioning (i.e., determining the location of the MCD based on the cell ID of the cell in which the MCD is located) may not be accurate enough to meet the stringent emergency positioning needs. Thus, there exists a need to improve positioning of an MCD, particular when the MCD is located indoors.

This disclosure relates to systems and methods for determining the location of an MCD. In one aspect, a method is performed by a positioning system for determining the location of the MCD. The positioning system includes one or more of: a positioning node and a base station. In some embodiments, the method includes the step of determining a cell in which the MCD is located (e.g., receiving a message including a cell identifier (cell ID) identifying the cell in which the MCD is located). The determined cell is served by a serving base station connected to a set of radio heads. Each one of the radio heads included in the set of radio heads is connected to the base station via a cable. The method further includes determining a cable length value (e.g., a cable loss value) representative of the length of the cable connecting the base station to a radio head serving the MCD. The method further includes using the determined cable length value to obtain location information identifying a location of the MCD. The location information may be associated with a fingerprint and comprise one or more of: i) a set of polygon coordinate vectors and ii) a set of coordinates derived from the set of polygon coordinate vectors.

In some embodiments, the step of determining the cable length value comprises: a positioning node of the positioning system receiving a message transmitted by the serving base station, the message comprising a measurement result information element, IE; and the positioning node using information included in the measurement result information element to calculate the cable length value. The positioning node may be an Evolved Serving Mobile Location Center, E-SMLC. The message may be an E-CID MEASUREMENT INITIATION RESPONSE or an E-CID MEASUREMENT REPORT. The information included in the measurement result information element may include one or more of: an amplifier gain value, G_amp, a downlink path loss value, L_dl, a power value indicative of a radio head transmit power, Prh, a noise factor of a radio unit of the serving base station, NF_ru, an inter-cell interference value, I_du, an uplink transmit power value P_ul_mcd indicating the transmit power of an uplink signal transmitted by the MCD, a power value representative of the power of the uplink signal transmitted by the MCD as measured by the serving base station, P_ul_mcd_du, and a signal to noise and interference ratio of the MCD as measured by a DU of the base station serving the MCD, SINR_mcd_du.

In some embodiments, the step of determining the cable length value further comprises: the positioning node receiving a second message transmitted by the MCD, the second message comprising a received power value indicating a received power of a downlink signal transmitted by the serving radio head as measured by the MCD, P_dl_mcd, and the positioning node using the information included in the measurement result information element and the P_dl_mcd to calculate the cable length value.

In some embodiments, the serving base station is a component of the positioning system. In such embodiments, the step of using the determined cable length value to obtain location information for the MCD may include: the serving base station generating a calculated cable length value; the serving base station determining the cable length value by selecting at least one predetermined cable length value using the calculated cable length value; and the serving base station transmitting to a positioning node of the positioning system a message comprising a radio head identifier identifying one of the radio heads, wherein the radio head identifier comprises at least one of: the selected cable length value and an identifier to which the selected cable length value is mapped. The positioning node then uses the radio head identifier to obtain the location information.

In other embodiments in which the serving base station is a component of the positioning system, the step of using the determined cable length value to obtain the location information for the MCD may include the serving base station generating a calculated cable length value and transmitting to a positioning node of the positioning system a message comprising the calculated cable length value. In such embodiments, the positioning node receives the message, determines the cable length value by selecting at least one predetermined cable length value using the received calculated cable length value, and uses the determined cable length value to obtain the location information for the MCD.

In some embodiments, the method further comprises the serving base station 1) receiving an RRC message transmitted by the MCD, the RRC message comprising a received power value indicating a received power of a downlink signal transmitted by the serving radio head as measured by the MCD, P_dl_mcd and 2) using P_dl_mcd to calculate the calculated cable length value.

In some embodiments, the obtained location information comprises one or more of i) a set of polygon coordinate vectors and ii) a set of coordinates derived from the set of polygon coordinate vectors. In such embodiments, using the determined cable length value to obtain the location information for the MCD comprises forming a fingerprint using the determined cable length value and using the formed fingerprint to obtain the location information for the MCD. The location information may include the set of polygon coordinate vectors, and the set of polygon coordinate vectors define a polygon and comprise at least three polygon coordinate vectors, each polygon coordinate vector comprising at least a first coordinate and a second coordinate. In such embodiments, the method may further include obtaining one or more measured radio property values, wherein the step of forming the fingerprint using the determined cable length value comprises forming the fingerprint using both the determined cable length value and the one or more measured radio property values.

In some embodiments, using the fingerprint to obtain the location information comprises sending to a database server a query for location information, where the query includes the fingerprint. The database server then uses the fingerprint included in the query to lookup the location information in a database.

In another aspect, the invention relates to a positioning system for determining the location of an MCD. In some embodiments, the positioning system is adapted to determine a cell in which the MCD is located. In such embodiments, the positioning system is further adapted to, such that, if the determined cell is being served by a serving base station connected to a set of radio heads via a set of corresponding cables, the positioning system determines a cable length value representative of the length of a cable connecting the base station to a radio head serving the MCD and uses the determined cable length value to obtain location information for the MCD.

The above and other aspects and embodiments are described below.

DETAILED DESCRIPTION

Disclosed herein are systems and methods for determining the location of an MCD that is being served by a radio head by determining a value corresponding to the length of the cable connecting the serving radio head to a base station (e.g., by determining the cable gain/loss). A significant advantage of the disclosed systems and methods is that they may provide up to eight times reduced position inaccuracy as compared to cell ID positioning. Additionally, the disclosed techniques can be used to improve the accuracy of Radio Measurements Trace processing servers (TPSs). TPSs play a major role in modern radio access network optimization by using geolocation measurements from MCDs to identify problems in the network. By using the positioning techniques disclosed herein, the position of specific events may be determined with higher accuracy, thereby improving TPS performance.

Figure 1:
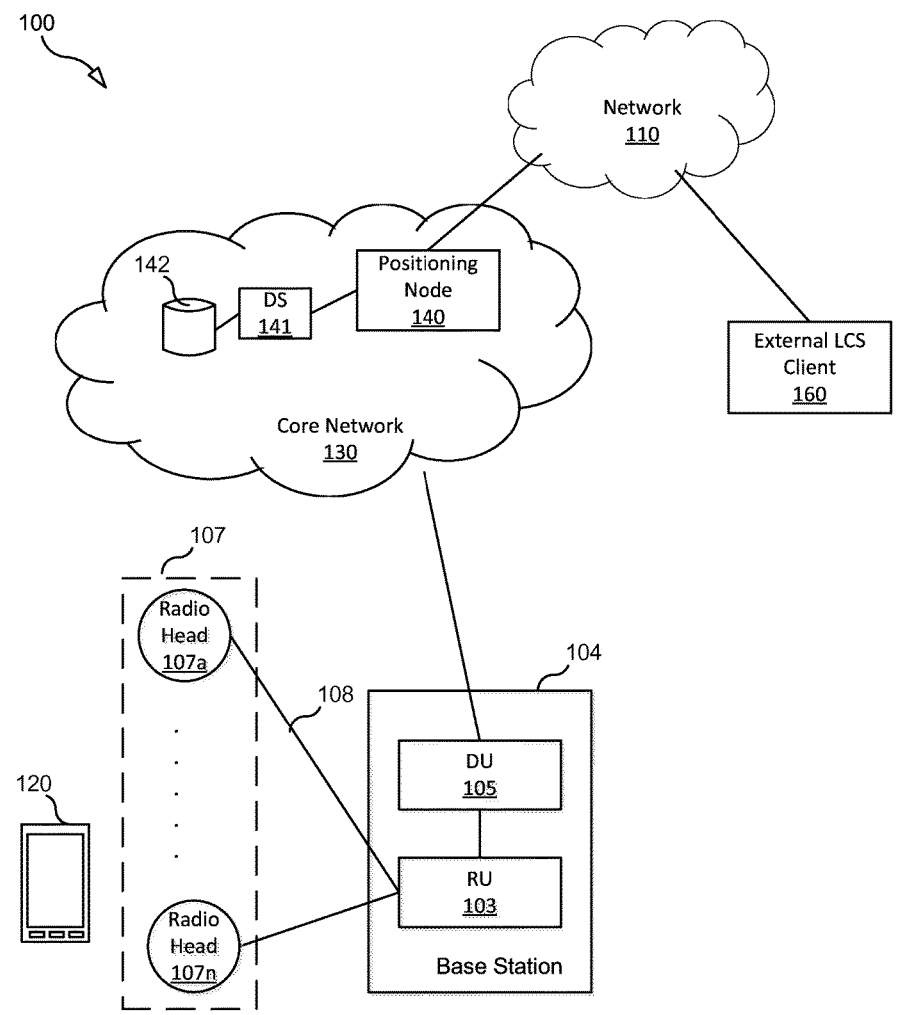
FIG. 1 is a block diagram of a positioning system, according to some embodiments.

FIG. 1 is a block diagram of a positioning system 100, according to some embodiments. The positioning system 100 includes a base station 104, which comprises a radio unit (RU) 103 and a digital unit (DU) 105. The RU 103 and the DU 105 may be housed in the same housing or they be housed in separate housings that may or may not be co-located. In some embodiments, such as where the RU 103 and the DU 105 are not coupled in the same housing, DU 105 may be connected to the RU 103 via a cable (e.g., optical, electrical). A set of one or more radio heads 107 (e.g., radio heads 107a to 107n in the example shown) is connected to base station 104 (more specifically, the radio heads are connected to RU 103 of base station 104). In some embodiments, each radio head 107 is connected via a cable 108, such as a local area network (LAN) cable (e.g., an Ethernet cable or other LAN cable), to the RU 103. Radio heads 107 includes one or more antenna elements for wirelessly transmitting signal to an MCD 120 and for wirelessly receiving signal transmitted by MCD 120. In some embodiments, radio heads 107 may further comprise a power amplifier. In some embodiments, RU 103 may comprise an indoor radio unit (IRU), and radio heads 107 may deliver mobile broadband access to the MCD 120 in a broad range of indoor locations.

Base station 104 may be connected to a core network 130 that includes a positioning node 140 for processing position requests as well as other core network nodes (e.g., a Mobility Management Entity (MME), a Serving Gateway (SGW), and Packet Data Network Gateway (PGW)). However, the embodiments disclosed herein are not limited to any specific type of core network. In embodiments where core network 130 is a core network of a Long Term Evolution (LTE) system, the positioning node 140 may comprise or consist of an Evolved Serving Mobile Location Center (E-SMLC) and the base station 104 may comprise or consist of an enhanced Node B (eNB). In embodiments where core network 130 is a WCDMA 3G cellular system, the positioning node 140 may comprise or consist of a stand-alone Serving Mobile Location Center (SAS) and the base station 104 may comprise or consist of a Node B. The positioning node 140 may also be located in a radio network controller (RNC).

In some embodiments, an LCS client 160 may transmit a positioning request to positioning node 140. In some embodiments, as shown in FIG. 1, LCS Client 160 may be a computer server connected to a network (e.g., the Internet), and thus is external to the core network 130.

In embodiments where core network 130 is an LTE network, a Gateway Mobile Location Center (GMLC) in network 130 may receive from the external LCS client 160 a position request for a particular location services target, e.g., MCD 120. The GMLC may then transmit the position request to an MME in core network 130. The MME may in turn forward the request to the positioning node 140 (E-SMLC in this example). The positioning node 140 may then process the location services request to perform a positioning of the target MCD 120. In some embodiments, the positioning node 140 may perform some or all of the processing for performing the calculations described in connection with FIGS. 2-6. In other embodiments, the base station 104 may perform some or all of the processing for performing the calculations described below in connection with FIGS. 2-6. The positioning node may then return the result of the position request back to the MME, which in turn will forward the position result back to requesting LCS client 160 (e.g., through the GMLC and network 110).

As described below, in situations where MCD 120 is being served by a radio head 107, such as radio head 107a (i.e., MCD 120 is in the vicinity of radio head 107a and is receiving and processing the signals transmitted by radio head 107a, and vice-versa), positioning node 140 is configured to determine the location of the MCD 120 by determining a value representative of the length of the cable connecting the radio head 107 that is serving MCD 120 to base station 104.

In the downlink direction, data from the DU 105 is sent to the RU 103 where it is transmitted in analogue form to the radio heads 107. In the uplink direction, the signal received on each of the radio heads 107 from the MCD 120 is amplified and then sent to the base station 104. In some embodiments, the gain of the amplifier can be set individually for each radio head 107. In some embodiments, there may be significant losses (e.g., up to 30 dB) associated with each cable (up to 200 m) connecting the one or more radio heads 107 to the base station 104. In some embodiments, such loss values may be configured in a database in base station 104.

In some embodiments, an estimate of the cable loss (L_cable) of the cable 108 connecting base station 104 with the radio head 107 serving the MCD 120 is calculated and then used to determine the location of MCD 120. The estimated cable loss can be used to determine a position of the MCD because, in many networks, each cable 108 connecting one of the radio heads 107 to base station 104 has a unique cable loss (cable loss is directly proportional to cable length and in many networks each radio head connected to a particular RU of base station 104 is connected by cable having a length that is different than the lengths of the other cables used to connect the other radio heads to the RU). Thus, if the estimated cable loss value is accurate enough, it can be mapped to a specific location because the actual cable lengths (or actual cable losses) may be measured at installation of the radio heads. Thus, the location of the MCD can be determined more accurately as the cell coverage area may be split up into smaller areas corresponding to each radio head. Furthermore, in embodiments where each radio head is associated with one floor of a building, it may be further possible to resolve location information to a floor of that building.

Additionally, in some embodiments a fingerprint can be formed using, among other things, a cable length value (e.g., the cable loss value) determined as described herein. This fingerprint can be associated with location information (e.g., a set of polygon coordinate vectors that define an adaptive enhanced cell ID (AECID) polygon and/or a set of coordinates derived from the set of polygon coordinate vectors (e.g., the derived set of coordinates corresponding to the center of gravity of the polygon)). As used herein a "fingerprint" is a set of one or more measured/determined values or a set of one or more values derived from the measured values.

For example, in some embodiments a fingerprint is formed from a determined cable length value and a set of one or more measured radio property values, which may include one or more of: a pathloss value, a cell identifier (ID), a received signal strength (RSS) value, a timing advance (TA) value, and angle of arrival (AoA) values. The advantage of associating a fingerprint with location information (e.g., a set of one or more coordinate vectors) is that, after the association has been created, a positioning system can obtain fingerprint information (e.g., determined cable length value, RSS, pathloss, TA, AoA, etc.) from, for example, an MCD and/or a base station serving the MCD, and use the obtained fingerprint information to generate a fingerprint and then use the fingerprint to query a location information database for location information (e.g. coordinate vector(s)) associated with the generated fingerprint.

Figure 2:
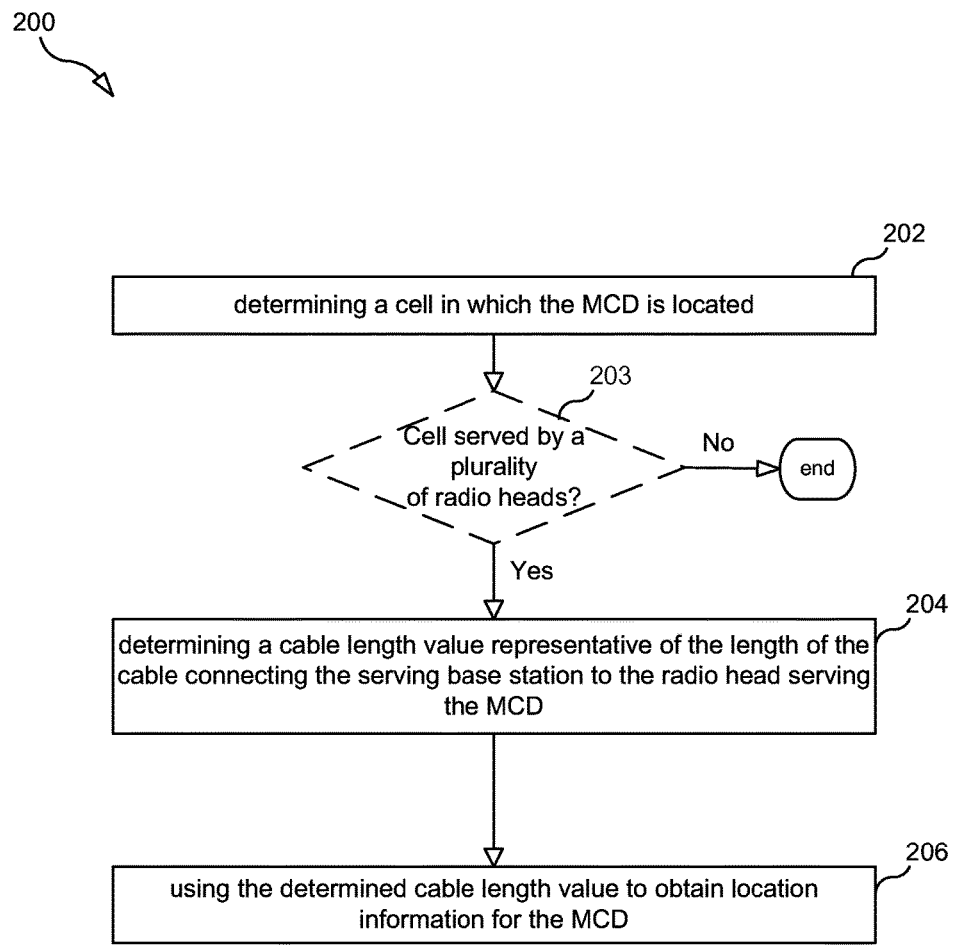
FIG. 2 is a flow chart of a location process, according to some embodiments.

Referring now to FIG. 2, FIG. 2 is a flow chart of a positioning process 200, according to some embodiments, performed by a positioning system for determining the location of MCD 120. In some embodiments, the positioning system comprises one or more of: MCD 102, positioning node 140, and base station 104.

Referring to FIG. 2, step 202 includes determining a cell in which MCD 120 is located, the determined cell being served by a serving base station (base station 104, in this example). As discussed above, cellular systems may be divided into cells (which may overlap), and each cell may be served by one specific base station. In some embodiments, step 202 comprises or consists of the positioning system obtaining a cell identifier (Cell ID) identifying the cell in which the MCD is located (e.g., receiving a message comprising the Cell ID).

In some embodiments, after step 202, the positioning system determines whether the determined cell is being served by a plurality of radio heads (step 203). If this is the case, then the process proceeds to step 204. For example, in step 203 the positioning system may use the Cell ID to obtain a database record from a database, which database record includes information identifying whether or not the determined cell is being served by a plurality of radio heads.

Step 204 includes determining a cable length value (C_length) representative of the length of the cable connecting the serving base station to the radio head serving the MCD. In some embodiments, determining the cable length value consists of determining L_cable (defined above). That is, L_cable is the determined cable length value. In some embodiments, the positioning node 140 may instruct the base station 104 to perform step 204.

In step 206, the determined cable length value is used to obtain location information for the MCD. For example, the determined cable length value can be a fingerprint (or can be used to form a fingerprint as described below with reference to FIG. 6) that is used in an AECID fingerprint positioning method. Accordingly, the location information obtained in step 206 may define an area in which the MCD is likely to be found. In some embodiments, the location information obtained in step 206 is a set of polygon coordinate vectors that together define a polygon defining an area in which the MCD is likely to be found. The polygon defined by the polygon coordinate vectors may be an AECID polygon, such as a polygon formed by the method disclosed in U.S. Patent Pub. No. 2013/0210458 or by the method disclosed in reference [1].

In some embodiments, each polygon coordinate vector has only two coordinates that define a point (e.g., a vertex of the polygon) on a two dimensional surface (a latitude and longitude). In other embodiments, each polygon coordinate vector has at least three coordinates that define a point in a three dimensional space (e.g., latitude, longitude, and altitude). In some embodiments, the location information obtained in step 206 is a set of coordinates derived from a set of polygon coordinate vectors (e.g., the derived set of coordinates corresponding to the center of gravity of the polygon defined by the polygon coordinate vectors).

In some embodiments, obtaining the location information for the MCD comprises: obtaining a set of predetermined cable length values; determining which one of a set of predetermined cable length values is closest to the determined cable length value; and estimating the location of the MCD using the predetermined cable length value that was determined to be closest to the determined cable length value.

In some embodiments, estimating the location of the MCD using the predetermined cable length value that was determined to be closest to the determined cable length value comprises using the predetermined cable length value to retrieve location information from a database (e.g., from a table) (e.g., using an identifier to which the predetermined cable length value is mapped to retrieve the location information). For example, each of the predetermined cable length values may be stored in a table that maps the predetermined cable length value to a position (e.g., to a floor of a building or a set of coordinates). Thus, determining an estimate of the cable length value allows one to map that information to a specific area (i.e., the entire area served by the serving radio head). In some embodiments, estimating the location of the MCD further comprises obtaining a path loss value representative of a path loss between the MCD and the serving radio head and using the path loss value to estimate the distance between the MCD and the serving radio head. This path loss feature enables the positioning system to further narrow the area in which the MCD is likely to be found. Additionally, in some embodiments, as described herein, an Adaptive Enhanced Cell Identity (AECID) fingerprinting method known in the art could be augmented to take into account location information determined in step 206.

In some other embodiments, determining the location of the MCD based on the determined cable length value (C_length) comprises: obtaining a set of predetermined cable length values (C_length_pre_i, i=1, 2, . . . , N); determining a subset of the set of predetermined cable length values that are within a certain threshold distance (T) of the determined cable length value; and estimating the location of the MCD using the determined subset of predetermined cable length values. That is, if |C_length_pre_i−C_length|<T, then C_length_pre_i is included in the subset of predetermined cable length values that are used to determine the location of the MCD. In some embodiments, when the subset includes two or more predetermined cable length values, the location of the MCD may be determined to be the union of the coverage areas of the radio heads corresponding to the subset of predetermined cable length values.

In some embodiments, step 204 includes calculating a plurality of cable length values (C_length_i, i=1, 2, . . . , M) (e.g., one cable length value is calculated for each radio head included in the set of radio heads). This could be needed since different radio heads may have different gain settings depending on the cable length. In this embodiment, each of the plurality of predetermined cable length values (i.e., C_length_pre_i) is compared against at least one of the calculated cable length values (C_length_i) in order to determine the predetermined cable length value that is closest to a calculated cable length value. For the case where M=N, one computes:

Argmin [|C_length_i−C_length_pre_i|, i] to determine the predetermined cable length value that is closest to a calculated cable length value. Alternatively, each of the plurality of predetermined cable length values is compared against at least one of the calculated cable length values in order to determine the subset of zero or more predetermined cable length values that are within a threshold distance of a calculated cable length value. As discussed above, this determined subset of predetermined cable length values is used to determine the position of the MCD.

In some embodiments, the set of predetermined cable length values may be obtained by retrieving the set of values from a database using the cell ID of the cell in which the MCD is located. That is, in some embodiments, the database links each cell ID included in a certain set of cell IDs with a set of cable length values. For example, suppose a given cell ID (e.g., cell-id-123) identifies a cell served by an RU of a base station that is connected to a set of radio heads. The database may link the given cell ID with a set of cable length values, where each one of the cable length values represents the length of the cable connecting one of the radio heads to the RU. The database may be hosted by DU 105, positioning node 140, or another entity.

In some embodiments, a 90% confidence radius (or other pre-configured confidence limit) may be calculated for every radio head position by calculating the standard deviation of C_length_pre_i around determined C_length. The confidence radius around the radio head will be given as function of Standard deviation of C_length_pre_i shown below in the equation below:

$$RH\_Conf\_Radius = f(Standard\_deviation(C\_length\_pre\_i)).$$

The calculated confidence interval could then be forwarded to a location based service or TPS system in a similar manner as Cell ID, TA, and other methods.

Figure 3:
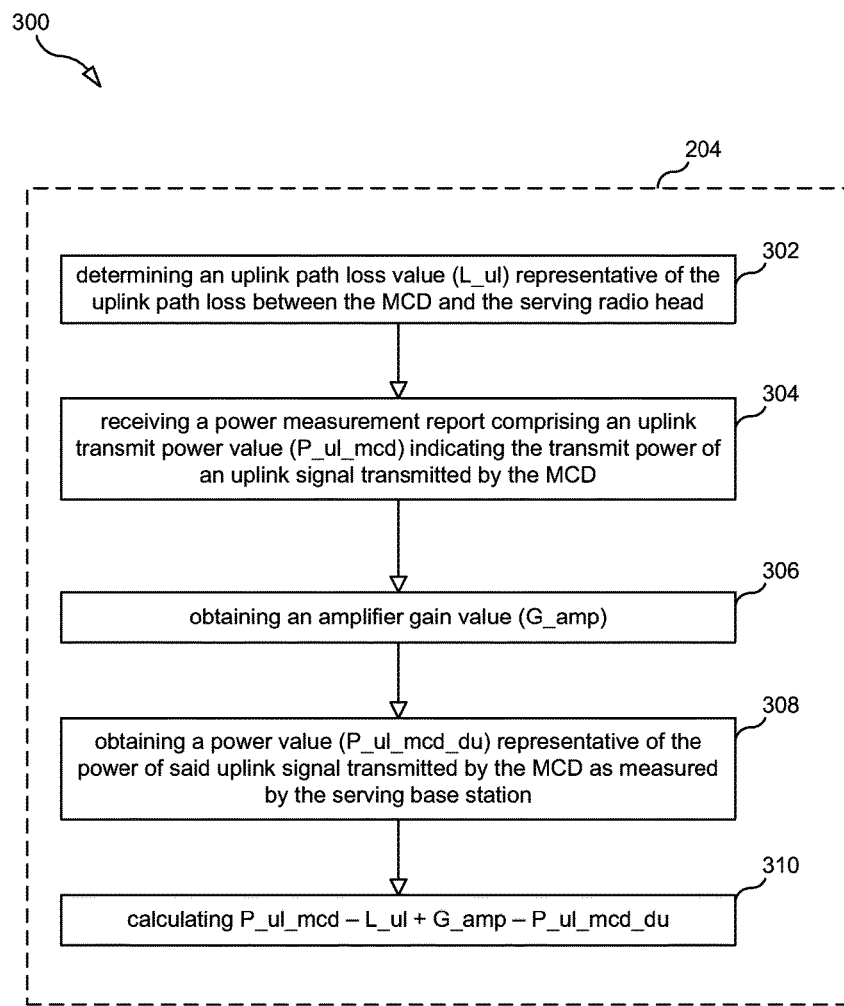
FIG. 3 is a flow chart of a process for determining a cable length value, according to some embodiments.

FIG. 3 is a flow chart of a process 300, according to some embodiments, performed by the positioning system for determining a cable length value (step 204). As noted above, the positioning system includes one or more of: positioning node 140 and base station 104.

In step 302, an uplink path loss value (L_ul) representative of the uplink path loss between the MCD and the serving radio head is determined. In some embodiments, L_ul may be determined from a calculated downlink path loss (L_dl) value. Thus, in some embodiments, in order to determine L_ul, the positioning node 140 may first order the base station 104 to determine the downlink path loss (L_dl). Determination of the L_ul value from the L_dl value is described in further detail below in connection with FIG. 5.

In step 304, a power measurement report comprising an uplink transmit power value (P_ul_mcd) indicating the transmit power of an uplink signal transmitted by the MCD is received. In some embodiments, the MCD 120 may report its uplink transmit power P_ul_mcd. In some embodiments, measurement orders may be transmitted to the MCD 120 from the serving base station 104 for the MCD to report the P_ul_mcd value. In the case of a Trace Processing Server (TPS) geolocation scenario, TPS may utilize 3G/4G Radio Enhanced Statistics (RES) features which turn on measurements on all MCDs to report P_ul_mcd, the uplink transmit power, in measurement reports. These measurements are called UeTxPower measurement, and are reported periodically (e.g., as frequently as every 2 seconds). Thus, the base station 104 may receive the P_ul_mcd value from the base station and perform further processing using that value. In other embodiments, the base station 104 may forward the P_ul_mcd value to the positioning node 140 for further processing.

In step 306, an amplifier gain value is obtained. The amplifier gain value (G_amp) may be set individually for each radio head 107a to 107n or each radio head may use the same amplifier gain value. In the latter case, only a single cable length value needs to be calculated, otherwise, in the former case the set of cable length values (C_length_i) is calculated, as described above. In some embodiments, the positioning node 140 and/or base station 104 may obtain G_amp from preconfigured information stored in a database.

In step 308, the power value representative of the power of the uplink signal transmitted by the MCD as measured by the serving base station (P_ul_mcd_du) is obtained. In some embodiments, the P_ul_mcd_du value can be determined from power headroom reports and the configured maximum value of the MCD 120 power. In some embodiments, the received MCD power (P_ul_mcd_du) is measured directly in the DU 105 of base station 104, e.g., after de-spreading in a WCDMA network. In some embodiments, the base station 104 sends the P_ul_mcd_du value to the positioning node 140, for further processing.

In step 310, P_ul_mcd−L_ul+G_amp−P_ul_mcd_du is calculated. In some embodiments, the positioning node 140 performs the calculation in step 310. In other embodiments, the base station 104 performs the calculation in step 310. In some embodiments, the cable loss value for the radio head (L_cable) connected to the MCD 120 is calculated according to the equation below:

$$L\_cable = P\_ul\_mcd - L\_ul + G\_amp - P\_ul\_mcd\_du$$

As described above, the cable loss value L_cable is representative of the length of the cable connecting the serving base station 104 to the radio head 107 serving the MCD 120.

Figure 4:
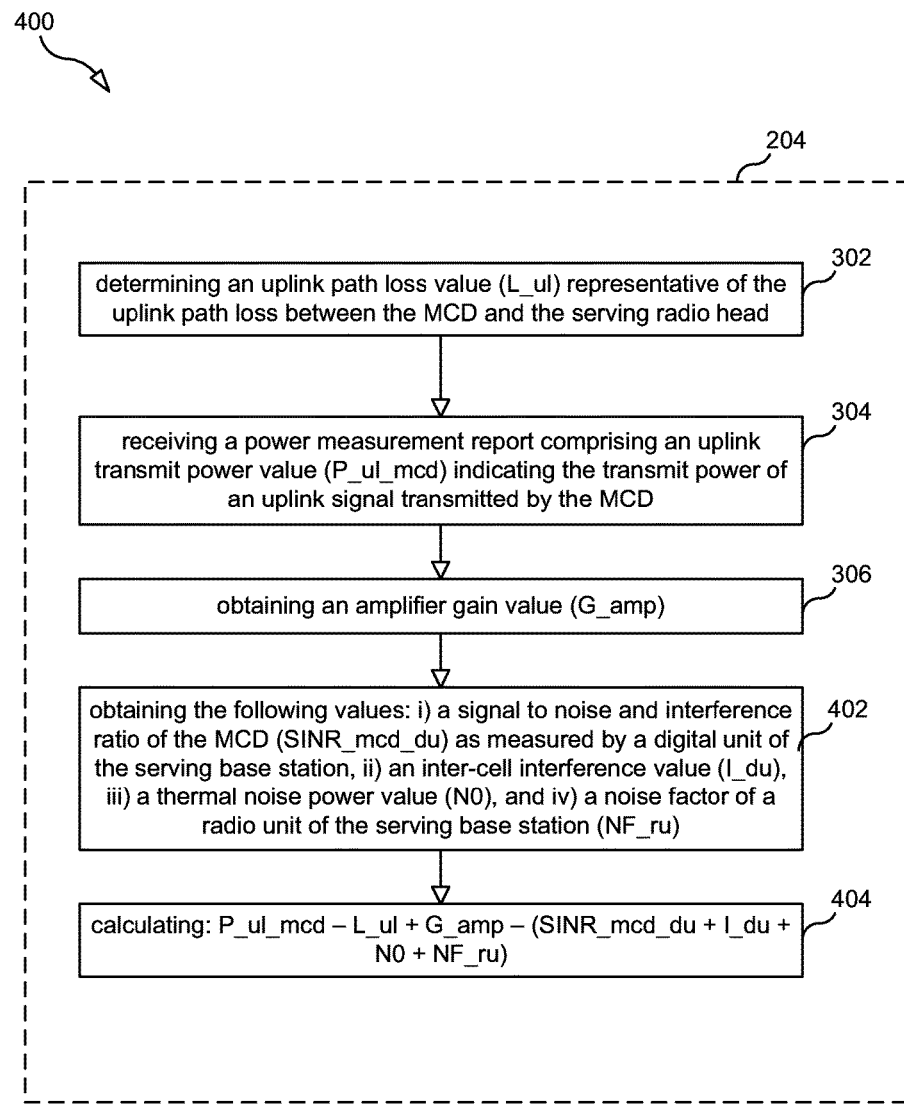
FIG. 4 is a flow chart of a process for determining a cable length value, according to some embodiments.

FIG. 4 is a flow chart of a process 400 for determining a cable length value, according to other embodiments. In some embodiments, the steps of cable length value determination process 400 may be performed by a positioning node 140. In other embodiments, the steps of cable length value determination process 400 may be performed by both a positioning node 140 and a base station 104. Like, process 300, process 400 includes steps 302-306 (see FIG. 3).

In step 402, the following values are obtained: i) a signal to noise and interference ratio of the MCD as measured by a DU of the base station serving the MCD (SINR_mcd_du), ii) an inter-cell interference value (I_du), iii) a thermal noise power value (N0), and iv) a noise factor of a radio unit of the serving base station (NF_ru).

The SINR_mcd_du value is measured by the DU 105 of the serving base station 104. Thus, in some embodiments, the base station 104 may obtain the SINR_mcd_du value and perform further processing using that value. In some embodiments, the DU 105 of base station 104 may simply transmit the SINR_mcd_du value to the positioning node 140 for further processing.

The N0+NF_ru value may be estimated in the RU 103 of base station 104. Alternatively, in some embodiments, instead of estimating values of N0+NF_ru, pre-configured values may be used. In other embodiments, different algorithms may be used to estimate the N0+NF_ru value.

One algorithm for estimating the N0+NF_ru value is the so denoted sliding window noise floor estimation. Since it may not be possible to obtain exact estimates of this value due to neighbor cell interference, the estimation algorithm applies an approximation using the soft minimum computed over a long window of time. Thus, this estimation relies on the fact that the noise floor may be constant over very long periods of time, disregarding the small temperature drift. However, the sliding window algorithm has a disadvantage of requiring a large amount of storage memory. The amount of storage memory may be particularly troublesome in cases where a large number of instances of the algorithm are needed, which may be the case when interference cancellation is introduced in the uplink.

Another algorithm for estimating the N0+NF_ru value is the so denoted recursive noise floor estimation. For example, to reduce the memory consumption of the sliding window algorithm described above, one such recursive algorithm is disclosed in T. Wigren, "Recursive noise floor estimation in WCDMA," IEEE Trans. Vehicular Tech., vol. 69, no. 5, pp. 2615-2620, 2010. The recursive algorithm may reduce the memory requirements of the sliding window algorithm described above by at least a factor of 100.

Thus, the N0+NF_ru value may be estimated by the base station 104 and be used for further processing. In some embodiments, the base station 104 may forward the N0+NF_ru value to the positioning node 140 for further processing.

Once the N0+NF_ru value is obtained, the neighbor cell interference value (I_du) may be determined using the equation shown below.

$$I\_du = P\_mcd\_total - P\_ul\_mcd\_du - N0 - NF\_ru$$

A more detailed explanation of the calculation of I_du is disclosed in T. Wigren, "Soft uplink load estimation in WCDMA," IEEE Trans. Vehicular Tech., vol. 58, no. 2, pp. 760-772, Feb. 2009, which is incorporated herein by reference.

In step 404, the following value is calculated, which is representative of the cable loss value of the cable (L_cable) connecting the serving base station 104 to the radio head 107 serving the MCD 120:

$$L\_cable = P\_ul\_mcd - L\_ul + G\_amp - (SINR\_mcd\_du + I\_du + N0 + NF\_ru)$$

Thus, in alternative embodiments, a value representative of (SINR_mcd_du+I_du+N0+NF_ru) may be used in lieu of the P_ul_mcd_du value described above in connection with step 308 of FIG. 3. The relationship between these two values is shown below:

$$P\_ul\_mcd\_du = SINR\_mcd\_du + I\_du + N0 + NF\_ru$$

Figure 5:
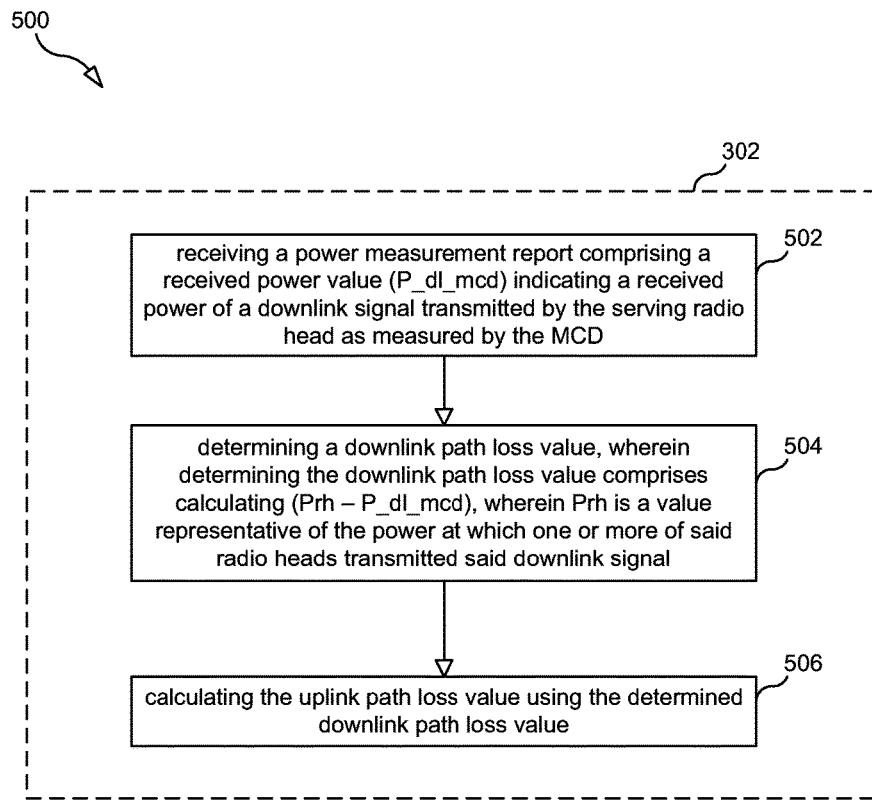
FIG. 5 is a flow chart of a process for determining the uplink path loss between an MCD and the serving radio head, according to some embodiments.

FIG. 5 is a flow chart of a process 500, according to some embodiments, for determining an uplink path loss value (L_ul) representative of the uplink path loss between the MCD and the serving radio head.

In step 502, a power measurement report comprising a received power value (P_dl_mcd) indicating a received power of a downlink signal transmitted by the serving radio head as measured by the MCD is received. In some embodiments, the MCD 120 may measure the received power (P_dl_mcd) for the radio head 107 to which it is connected. In some embodiments, measurement orders may be transmitted to the MCD 120 from the serving base station 104 for MCD to measure the P_dl_mcd value. In the case of a TPS geolocation scenario, TPS may utilize 3G/4G RES features which turn on measurements on all MCDs to report $P_{dl\_mcd}$, the downlink transmit power, in measurement reports. These measurements are called UeRxPower measurement and are reported periodically (e.g., as frequently as every 2 seconds). Thus, the MCD 120 may transmit the measured P_dl_mcd value in a measurement report as the UeRxPower to the base station 104. In some embodiments, base station 104 may send the P_dl_mcd value to the positioning node 140 for determination of L_ul, and in other embodiments, determination of L_ul may be performed by the base station 104.

In step 504, a downlink path loss value (L_dl) is determined, wherein the determination comprises calculating (P_dl_mcd–Prh), wherein Prh is a value representative of the power at which the radio head transmitted the downlink signal. In some embodiments, the configured downlink transmit power Prh may be known for each radio head 107.

Thus, a downlink path loss value (L_dl) may be determined according to the equation below:

$$L\_dl = P\_rh - P\_dl\_mcd$$

In embodiments where all radio heads have a different power (Prh_i) in the downlink signal, the L_dl_i value may be determined according to the equation below:

$$L\_dl\_i = Prh\_i - P\_dl\_mcd$$

Alternatively, in some embodiments, a dedicated measurement may be used for L_dl.

In step 506, the uplink path loss value is calculated using the determined downlink path loss value. Thus, in some embodiments the uplink path loss value (L_ul) may be determined from the downlink path loss (L_dl) value determined in step 504. In some embodiments, once the L_dl value is determined, the positioning node 140 may then order the base station 104 to perform a measurement of the uplink path loss (L_ul). Alternatively, the positioning node 140 may perform a measurement of the uplink path loss. In some embodiments, it may be assumed (for simplicity) that the propagation conditions of the uplink are similar to those of the downlink, and thus L_ul=L_dl. For example, in the case of time division duplex, the reciprocity of the propagation can be used to motivate why L_ul=L_dl.

Alternatively, in the case of frequency division duplex, a calculation that is correct on average may be made to conclude a functional dependence between L_ul and L_dl. In such scenarios, a compensation value depending on the carrier frequency ($f_{carrier}$) is typically needed. Thus, the following general relation shown in the equation below may be assumed to hold:

$$L\_ul = F(L\_dl, f\_carrier)$$

The above relation may have errors; however, these errors may be assumed to be small as compared to the cable loss variation that may approach 30 dB for the Ethernet cable technology used with certain small cell systems, such as DTS.

Figure 6:
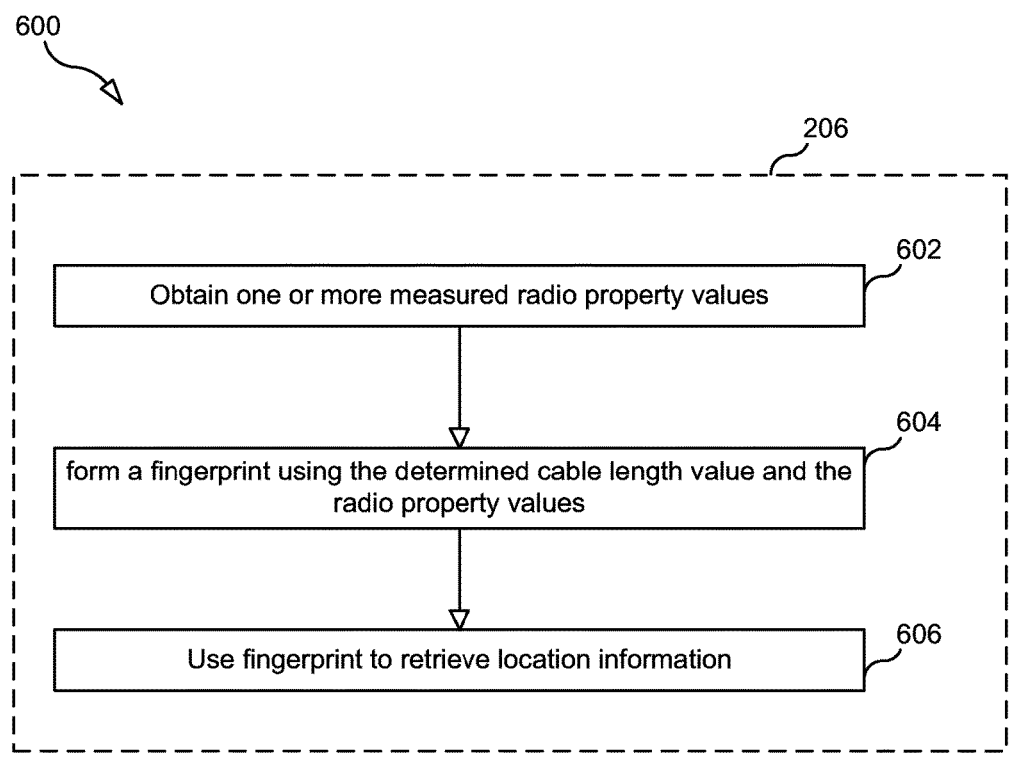
FIG. 6 is a flow chart of a process for using a determined cable length value to obtain location information for an MCD, according to some embodiments.

FIG. 6 is a flow chart of a process 600 for performing step 206 (i.e., a process for using a determined cable length value to obtain location information for an MCD), according to some embodiments. Process 600 begins in step 602, where one or more measured radio property values is obtained. The radio property values obtained in step 602 may include one or more of: a pathloss value indicating a pathloss between MCD 120 and base station 104, a cell identifier (ID) identifying base station 104, a received signal strength (RSS) value indicating the strength of a signal received by MCD 120, a timing advance (TA) value, and angle of arrival (AoA) values.

In step 604 a fingerprint is formed using the determined cable length value (e.g. cable loss value, as described herein) and the obtained radio property value(s). Forming the fingerprint, in some embodiments, consists of forming a data structure that stores the determined cable length value and the obtained radio property value(s). In other embodiments, forming the fingerprint consists of calculating a value or values based on the determined cable length value and the obtained radio property value(s). For example, a hash function can be used to generate the fingerprint from the determined cable length value and the obtained radio property value(s).

In step 606, the fingerprint formed in step 604 is used to retrieve the location information. For example, in step 606, positioning node 140 may form a query comprising the fingerprint and send the query to a database server (DS) 141 that uses the fingerprint to lookup in a location fingerprint database 142 location information that is associated with the fingerprint and then provide the retrieved location information to positioning node 140. In some embodiments, the database server 141 and/or database 142 may be a component of positioning node 140.

Figure 7:
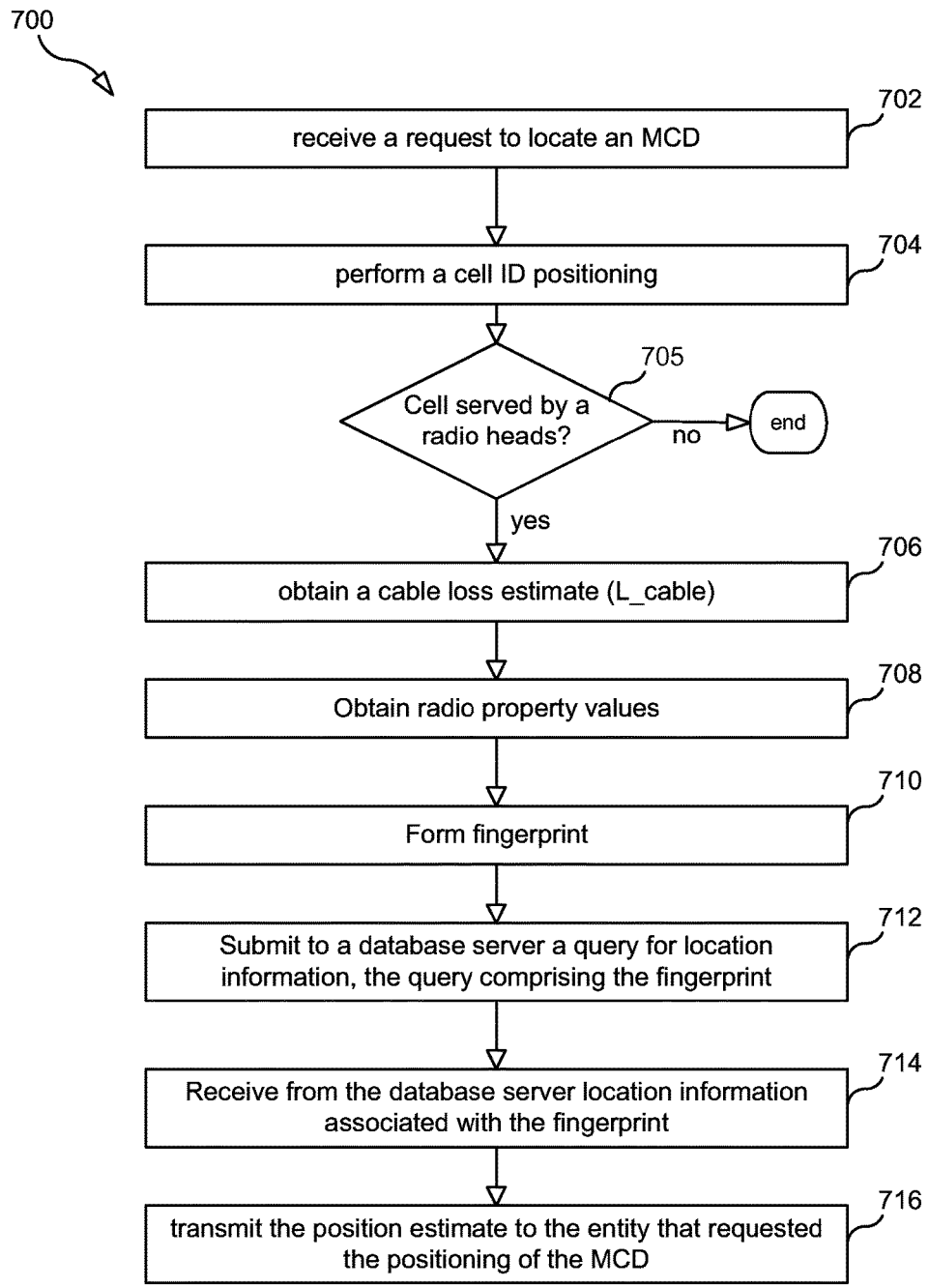
FIG. 7 is a flow chart of a location process, according to some embodiments.

FIG. 7 is a flow chart of a location process 700, according to some embodiments, for locating MCD 120. Process 700 may be performed by positioning system 100 (e.g., it may be performed in whole or in part by the positioning node 140 and/or the base station 104).

In step 702, a request is received to locate MCD 120. For example, in some embodiments, the location request may be submitted by a LCS client 160 to the positioning node 140, potentially through one or more intermediaries as described above. In some embodiments, once the positioning node 140 receives the location request.

In step 704, a cell ID positioning is performed. For example, the positioning node 104 obtains one or more cell IDs identifying the cell in which MCD 120 is located. For instance, in step 704 positioning node may receive from base station 104 an Long Term Evolution (LTE) Positioning Protocol A (LPPa) message comprising an E-CID Measurement Result Information Element (IE), which contains a Physical Cell Identifier (PCI) and a E-UTRAN Cell Global Identifier (ECGI).

In step 705, based on the obtained cell ID, a determination is made as to whether the cell identified by the cell ID is served by a plurality of radio heads connected to a base station. If yes, the process continues to step 706, otherwise the process ends.

In step 706, a cable loss estimate (L_cable) is obtained (e.g., in step 706 a set of cable loss values (i.e., L_cable_i, i=1, 2, . . . , M) is obtained). The cable loss estimate L_cable may be calculated by the positioning node 140 and/or the base station 104 as described above in connection with FIGS. 3-4. In embodiments in which base station 104 calculates L_cable, base station 104 may be configured to provide to positioning node 140 the L_cable value. For example, as discussed above with respect to step 704, base station 104 may provide to node 140 an LPPa message (e.g., an E-CID Measurement Initiation Response or an E-CID Measurement Report) comprising an E-CID Measurement Result IE, which IE may also comprise the L_cable value in addition to the cell identifiers.

In step 708, a set of one or more radio property values are obtained (e.g., step 708 may be the same as step 602 of process 600).

In step 710, a fingerprint is formed using L_cable and the values obtained in step 708 (e.g., step 710 may be the same as step 604 of process 600).

In step 712, a query for location information is submitted to database server 141, where the query includes the fingerprint.

In step 714, location information associated with the fingerprint is received from the database server 141. As described above, the location information may comprise a set of polygon coordinate vectors and/or a set of coordinate derived from the coordinate vectors.

In step 716, the location information (or location information derived therefrom) is transmitted to the entity that requested the positioning of MCD 120.

Figure 8:
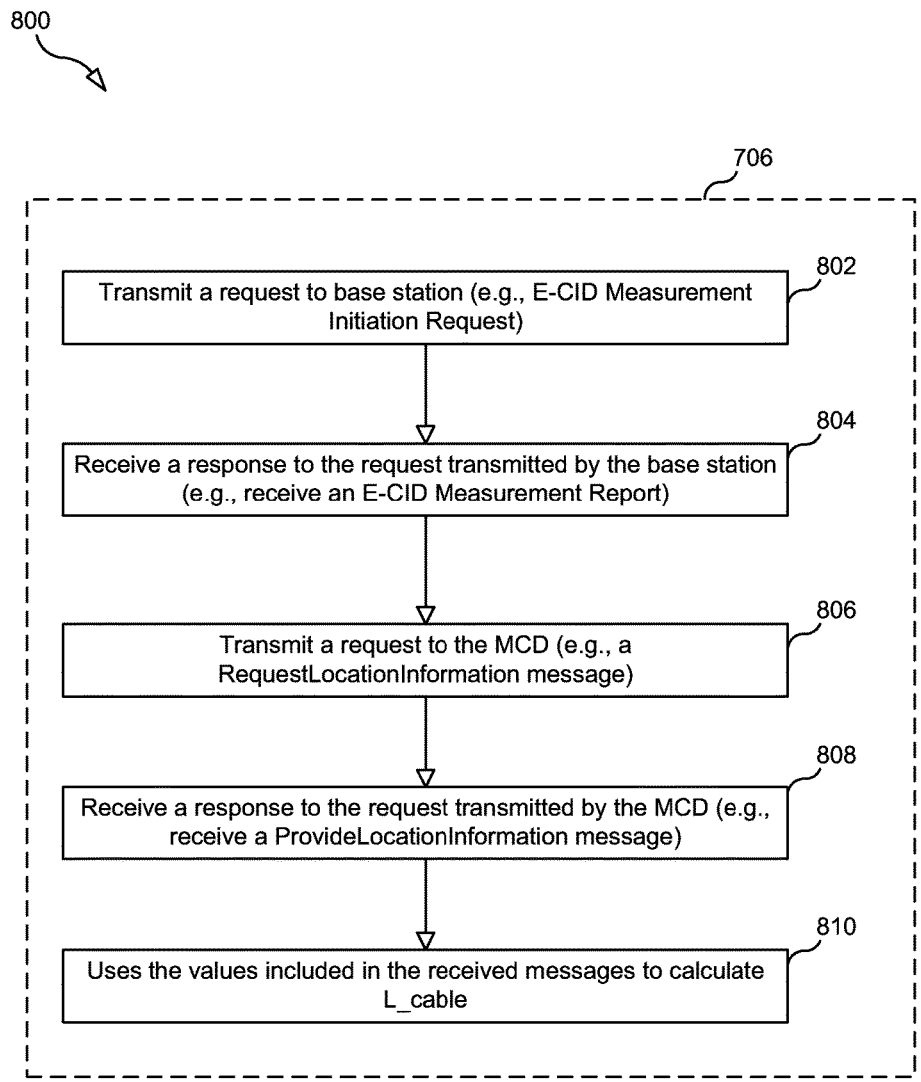
FIG. 8 is a flow chart of a location process, according to some embodiments.

FIG. 8 is a flow chart illustrating a process 800, according to some embodiments, for implementing step 706 in embodiments where positioning node 140 performs step 706. As shown in FIG. 8, step 706 may begin with positioning node 140 transmitting a first request to the base station serving the cell identified in step 704 (step 802). In some embodiments the first request is an LPPa E-CID Measurement Initiation Request. In response to receiving the first request, the serving base station transmits a response and positioning node receives the response (step 804). In some embodiments the response is one of an LPPa E-CID Measurement Initiation Response message and an LPPa E-CID Measurement Report message, each of which includes an LPPa E-CID Measurement Result IE.

In such embodiments, the E-CID Measurement Result IE may comprises one or more of the following values: an amplifier gain value (G_amp), a downlink path loss value (L_dl), a power value indicative of a radio head transmit power (Prh), a thermal noise power value (N0), a noise factor of a radio unit of the serving base station (NF_ru), inter-cell interference value (I_du), an uplink transmit power value indicating the transmit power of an uplink signal transmitted by the MCD (P_ul_mcd), a power value representative of the power of the uplink signal transmitted by the MCD as measured by the serving base station (P_ul_mcd_du), and a signal to noise and interference ratio of the MCD as measured by a DU of the base station serving the MCD (SINR_mcd_du).

In step 806, positioning node 140 transmits to MCD 120 a second request. In some embodiments, the second request is an LPP message, such as a RequestLocationInformation message. In response to receiving the second request, MCD 120 transmits a response and positioning node receives the response (step 808). In some embodiments the response is an LPP message (e.g., a ProvideLocationInformation message), which includes an ECID-ProvideLocationInformation IE. In such embodiments, the ECID-ProvideLocationInformation IE comprises a received power value (P_dl_mcd) indicating a received power of a downlink signal transmitted by the serving radio head as measured by the MCD.

In step 810, positioning node 140 uses the values included in the messages received from the base station and the MCD to calculate L_cable. In this way, positioning node 140 can perform step 706.

Figure 9:
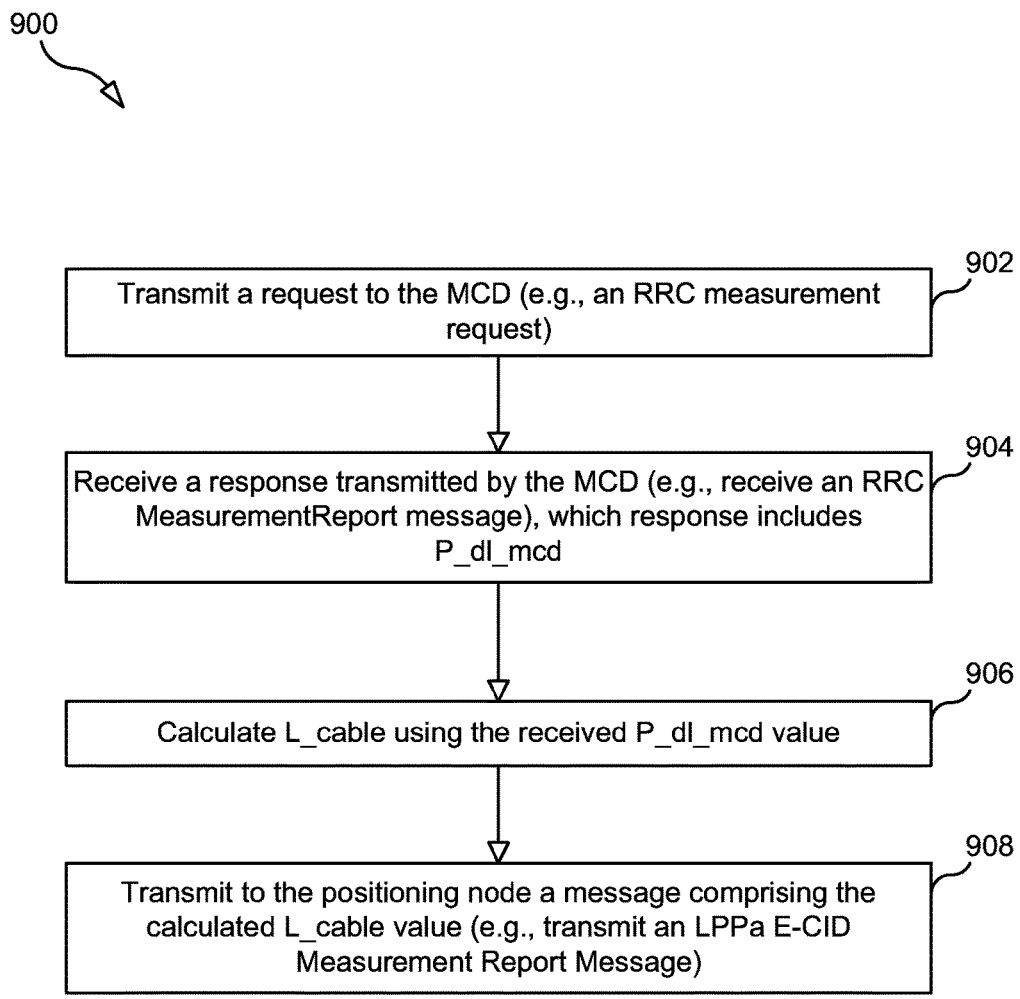
FIG. 9 is a flow chart of a location process, according to some embodiments.

FIG. 9 is a flow chart illustrating a process 900, according to some embodiments, that is performed by base station 104.

In step 902, base station 104 transmits to MCD 120 a request message (e.g., an RRC request message).

In step 904, base station 104 receives a response message transmitted by MCD 120 in response to the request message, which response message includes a received power value (P_dl_mcd) indicating a received power of a downlink signal transmitted by the serving radio head as measured by the MCD. In some embodiments, the response message is an RRC message (e.g., a MeasurementReport message) that includes a MeasResults IE that includes the P_dl_mcd value.

In step 906, base station 104 calculates an L_cable value using the P_dl_mcd value obtained from the MCD together with other values measured and/or obtained by the base station (e.g., P_ul_mcd, Prh, P_dl_mcd, G_amp, P_ul_mcd_du, etc.). For example, as described above with respect to FIG. 3, base station 104 may calculate L_cable as follows: L_cable=P_ul_mcd−(Prh−P_dl_mcd)+G_amp−P_ul_mcd_du. In other embodiments, base station 104 may calculate L_cable using the algorithm shown in step 404 of FIG. 4.

In step 908, base station 104 transmits to positioning node 140 a message comprising the calculated L_cable value. The message transmitted in step 908 may be an LPPa message, such as an LPPa E-CID Measurement Initiation Response message and or LPPa E-CID Measurement Report message, each of which includes an LPPa E-CID Measurement Result IE that contains the calculated L_cable value (if more than one L_cable value is calculated, then the IE may contain all of the calculated L_cable values). In some embodiments, the base station uses the calculated L_cable value(s) to select a set of one or more radio heads and, for each selected radio head, includes in the E-CID Measurement Result IE a radio head identifier for identifying the selected radio head.

Figure 10:
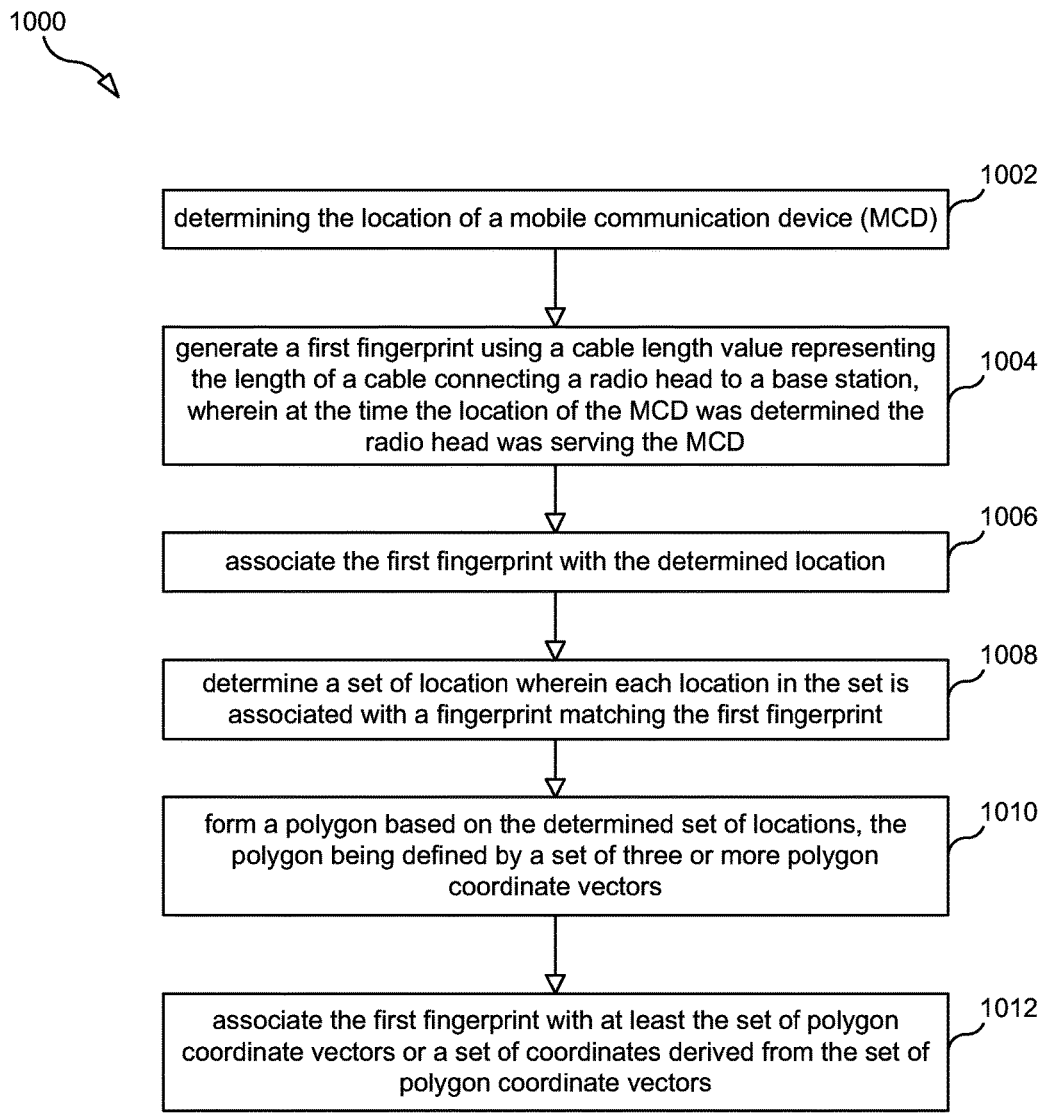
FIG. 10 is a flow chart for creating a database that associates fingerprints with location information, according to some embodiments.

FIG. 10 is a flow chart illustrating a process 1000 for populating location fingerprint database 142 with location information. Process 1000 may begin in step 1002, where the location of MCD 120 is determined. The location determined in step 1002 may be high precision location that is determined using, for example, Assisted Global Positioning System (A-GPS) positioning. It may also be a pre-surveyed position in an indoor environment, for example defined on a map.

In step 1004, a first fingerprint is generated using a cable length value representing the length of a cable connecting a radio head to a base station, wherein at the time the location of MCD 120 was determined in step 1002 the radio head was serving MCD 120.

In step 1006, the first fingerprint is associated with the location determined in step 1002.

In step 1008, a set of locations is determined wherein each location in the set is associated with a fingerprint matching the first fingerprint. For example, in step 1008 a database is searched using the first fingerprint to find all other locations that are also associated with the first fingerprint.

In step 1010, a polygon is formed based on the determined set of locations, where each location in the set is associated with the same fingerprint. The polygon being defined by a set of three or more polygon coordinate vectors, each said polygon coordinate vector identifying a different vertex of the polygon.

In step 1012, the first fingerprint is associated with location information that comprises at least the set of polygon coordinate vectors or a set of coordinates derived from the set of polygon coordinate vectors. For example, in step 1012 a record is added to location fingerprint database 142, which record includes a first field for storing the first fingerprint and a second field for storing the location information. In this way, for example, fingerprints can be associated with location information, typically represented by polygons.

Figure 11:
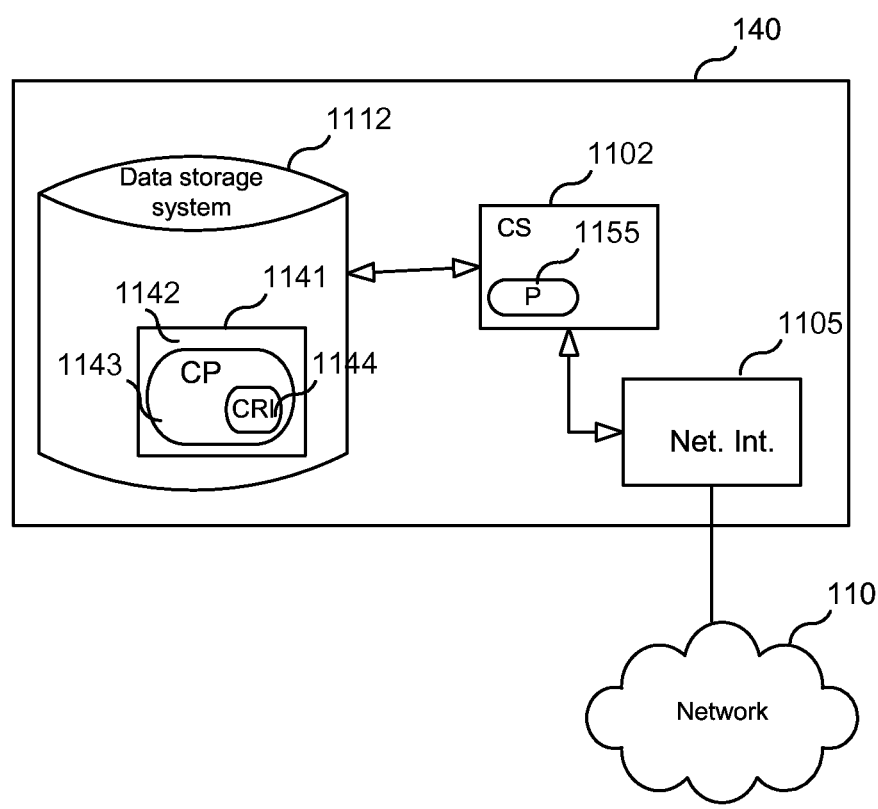
FIG. 11 is a block diagram of a positioning node apparatus, according to some embodiments.

FIG. 11 is a block diagram of a positioning node apparatus, such as positioning node 140. As shown in FIG. 11, positioning node 140 may include or consist of: a computer system (CS) 1102, which may include one or more processors 1155 (e.g., a microprocessor) and/or one or more circuits, such as an application specific integrated circuit (ASIC), field-programmable gate arrays (FPGAs), a logic circuit, and the like; a network interface 1105 for connecting apparatus 104 to a network 110; and a data storage system 1112, which may include one or more non-volatile storage devices and/or one or more volatile storage devices (e.g., random access memory (RAM)). In embodiments where apparatus 140 includes a processor 1155, a computer program product (CPP) 1141 may be provided. CPP 1141 includes or is a computer readable medium (CRM) 1142 storing a computer program (CP) 1143 comprising computer readable instructions (CRI) 1144 for performing steps described herein (e.g., one or more of the steps shown in FIGS. 2-10). CP 1143 may include an operating system (OS) and/or application programs. CRM 1142 may include a non-transitory computer readable medium, such as, but not limited, to magnetic media (e.g., a hard disk), optical media (e.g., a DVD), solid state devices (e.g., random access memory (RAM), flash memory), and the like.

In some embodiments, the CRI 1144 of computer program 1143 is configured such that when executed by computer system 1102, the CRI causes the apparatus 1140 to perform steps described above (e.g., steps described above and below with reference to the flow charts shown in the drawings). In other embodiments, positioning node apparatus 140 may be configured to perform steps described herein without the need for a computer program. That is, for example, computer system 1102 may consist merely of one or more ASICs. Hence, the features of the embodiments described herein may be implemented in hardware and/or software.

Figure 12:
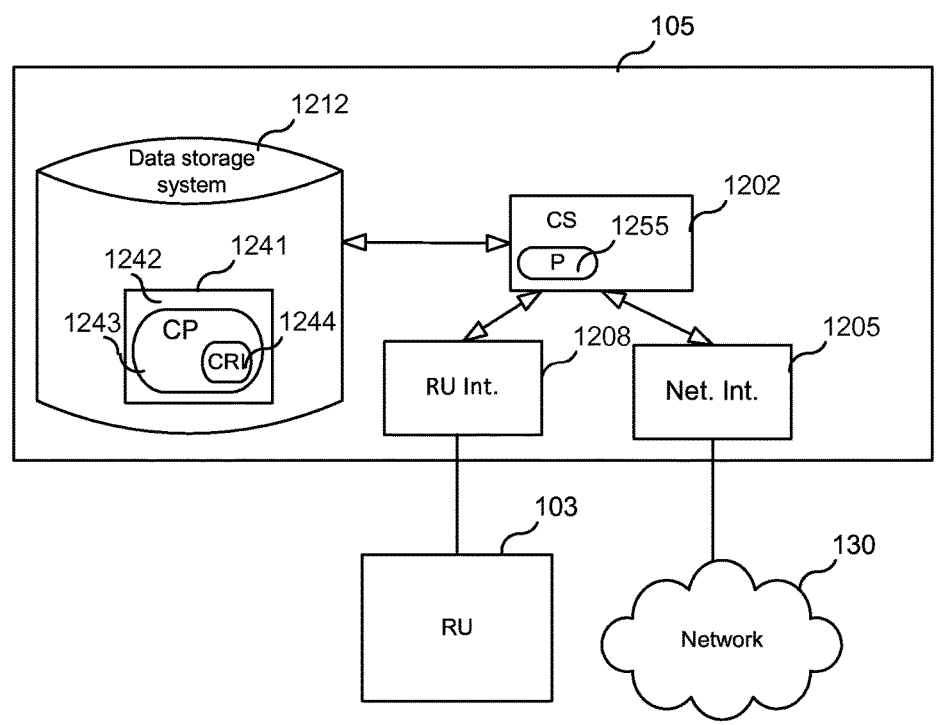
FIG. 12 is a block diagram of a digital unit apparatus, according to some embodiments.

FIG. 12 is a block diagram of DU 105, according to some embodiments. As shown in FIG. 12, DU apparatus 105 may include or consist of: a computer system (CS) 1202, which may include one or more processors 1255 (e.g., a microprocessor) and/or one or more circuits, such as an application specific integrated circuit (ASIC), field-programmable gate arrays (FPGAs), a logic circuit, and the like; a network interface 1205 for connecting DU 105 to network 130; one or more RU interfaces 1208 for connecting DU 105 to one or more RUs; and a data storage system 1212, which may include one or more non-volatile storage devices and/or one or more volatile storage devices (e.g., random access memory (RAM)). In some embodiments, network interface 1205 and RU interface 1208 include a transceiver for transmitting data and receiving data.

In embodiments where DU apparatus 105 includes a processor 1255, a computer program product (CPP) 1241 may be provided. CPP 1241 includes or is a computer readable medium (CRM) 1242 storing a computer program (CP) 1243 comprising computer readable instructions (CRI) 1244 for performing steps described herein (e.g., one or more of the steps shown in FIGS. 2-10). CP 1243 may include an operating system (OS) and/or application programs. CRM 1242 may include a non-transitory computer readable medium, such as, but not limited, to magnetic media (e.g., a hard disk), optical media (e.g., a DVD), solid state devices (e.g., random access memory (RAM), flash memory), and the like.

In some embodiments, the CRI 1244 of computer program 1243 is configured such that when executed by computer system 1202, the CRI causes the apparatus 105 to perform steps described above (e.g., steps described above and below with reference to the flow charts shown in the drawings). In other embodiments, apparatus 105 may be configured to perform steps described herein without the need for a computer program. That is, for example, computer system 1202 may consist merely of one or more ASICs. Hence, the features of the embodiments described herein may be implemented in hardware and/or software.

While various embodiments have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps

ABBREVIATIONS

RH_i=Radio head i of a maximum of n.
P_ul_mcd=The uplink transmit power as transmitted by the MCD [dBw].
P_dl_mcd=The measured received power in the downlink as measured by the MCD [dBw]
L_ul=The uplink path loss between the MCD and the serving radio head [dB].
L_dl=The downlink path loss between the serving radio head and the MCD [dB].
Prh=The transmit power of the radio head [dBw].
G_amp=The gain of the uplink amplifier of the radio head [dB].
L_cable=The determined cable loss [dB].
NF_ru=The noise factor of the RU [dB].
SINR_mcd_du=The signal to noise and interference ratio of the MCD, as measured in the DU [dB]
P_ul_mcd_du=The MCD power, as measured in the DU [dBw].
P_mcd_total=the total power of the MCD
N0=Thermal noise power [dBw].
I_du=Inter-cell interference [dBw].
C_length=a cable length value
AECID=Adaptive enhanced cell ID
E-CID=Enhanced Cell ID
RRC=Radio Resource Control

The invention claimed is:

1. A method performed by a positioning system for determining a location of a mobile communication device (MCD), the method comprising:
  determining a cell in which the MCD is located, the determined cell being served by a serving base station connected to a set of radio heads, wherein each one of the radio heads included in the set of radio heads is connected to the serving base station via a cable;
  determining a cable length value representative of the length of a cable connecting the serving base station to a radio head serving the MCD; and
  using the determined cable length value representing the length of the cable connecting the serving base station to the radio head serving the MCD to obtain location information for the MCD, wherein
  the step of determining the cable length value representing the length of the cable connecting the serving base station to the radio head serving the MCD comprises:
    a positioning node of the positioning system receiving a message transmitted by the serving base station, the message comprising a set of one or more parameters enabling the positioning node to calculate a cable loss value (L_cable) of the cable connecting the serving base station to the radio head serving the MCD, the set of parameters comprising one or more of: i) a power value representative of the power of an uplink signal transmitted by the MCD as measured by the serving base station (P_ul_mcd_du) and ii) a signal to noise and interference ratio (SINR) as measured by the serving base station;
    the positioning node using the received set of parameters to calculate the cable loss value of the cable connecting the serving base station to the radio head serving the MCD; and
    the positioning node determining the cable length value representing the length of the cable connecting the serving base station to the radio head serving the MCD using the calculated cable loss value.

2. The method of claim 1, wherein
  the set of parameters comprises the power value representative of the power of an uplink signal transmitted by the MCD as measured by the serving base station.

3. The method of claim 1, wherein
  the positioning node comprises an Evolved Serving Mobile Location Center, E-SMLC, and
  the message is one of: an Enhanced Cell Identifier (E-CID) MEASUREMENT INITIATION RESPONSE and an E-CID MEASUREMENT REPORT.

4. The method of claim 2, wherein the set of parameters enabling the positioning node to calculate a cable loss value further comprise:
  a power value indicative of a power at which the radio head serving the MCD is transmitting signals to the MCD, and
  an uplink transmit power value (P_ul_mcd) indicating the transmit power of an uplink signal transmitted by the MCD.

5. The method of claim 1, wherein
  the method further comprises the positioning node receiving a second message transmitted by the MCD, said second message comprising a received power value indicating a received power of a downlink signal transmitted by the serving base station as measured by the MCD (P_dl_mcd), and
  the positioning node uses said set of parameters received from the serving base station and said received power value indicating a received power of a downlink signal transmitted by the serving base station as measured by the MCD (P_dl_mcd) to calculate the cable loss value.

6. The method of claim 4, wherein
  the set of parameters further comprise: an amplifier gain value, G_amp, and a downlink path loss value, L_dl, and
  using the received set of parameters to calculate the cable loss value comprises calculating the cable loss value using Prh, P_ul_mcd, G_amp, and L_dl as inputs to the calculation, wherein Prh is said power value indicative of the power at which the radio head serving the MCD is transmitting signals to the MCD.

7. The method of claim 1, wherein
  the step of determining the cable length value using the calculated cable loss value comprises the positioning node selecting at least one predetermined cable length value using the calculated cable loss value.

8. The method of claim 1, wherein the set of parameters further comprises:
  a power value indicating a received power of a downlink signal transmitted by the serving base station as measured by the MCD (P_dl_mcd).

9. The method of claim 1, wherein the obtained location information comprises one or more of i) a set of polygon coordinate vectors and ii) a set of coordinates derived from the set of polygon coordinate vectors.

10. The method of claim 9, wherein using the determined cable length value to obtain the location information for the MCD comprises:
  forming a fingerprint using the determined cable length value; and
  using the formed fingerprint to obtain the location information for the MCD.

11. The method of claim 10, wherein
  the location information comprises the set of polygon coordinate vectors, and the set of polygon coordinate vectors define a polygon and comprise at least three polygon coordinate vectors, each polygon coordinate vector comprising at least a first coordinate and a second coordinate.

12. The method of claim 10, further comprising obtaining one or more measured radio property values, wherein forming the fingerprint using the determined cable length value comprises forming the fingerprint using both the determined cable length value and the one or more measured radio property values.

13. The method of any of claim 10, wherein using the fingerprint to obtain the location information for the MCD comprises sending to a database server a query for location information, the query comprising the fingerprint, wherein the database server uses the fingerprint included in the query to lookup the location information in a database.

14. A positioning system for determining a location of a mobile communication device (MCD), the positioning system being adapted to:
   determine a cell in which the MCD is located;
   if the determined cell is being served by a serving base station connected to a set of radio heads via a set of corresponding cables, the positioning system is further adapted to:
   determine a cable length value representative of the length of a cable connecting the serving base station to a radio head serving the MCD; and
   use the determined cable length value to obtain location information for the MCD, wherein
   the positioning system is adapted to determine the cable length value by performing a process comprising:
      receiving a message transmitted by the serving base station, the message comprising a set of one or more parameters enabling the positioning node to calculate a cable loss value (L_cable) of the cable connecting the serving base station to the radio head serving the MCD, the set of parameters comprising one or more of: i) a power value representative of the power of an uplink signal transmitted by the MCD as measured by the serving base station (P_ul_mcd_du) and ii) a signal to noise and interference ratio (SINR) as measured by the serving base station;
      using the received set of parameters to calculate the cable loss value of the cable connecting the serving base station to the radio head serving the MCD; and
      determining the cable length value using the calculated cable loss value.

15. The positioning system of claim 14, wherein the set of parameters comprises the power value representative of the power of an uplink signal transmitted by the MCD as measured by the serving base station.

16. The positioning system of claim 14, wherein
   the positioning node comprises an Evolved Serving Mobile Location Center, E-SMLC, and
   the message is one of: an Enhanced Cell Identifier (E-CID) MEASUREMENT INITIATION RESPONSE and an E-CID MEASUREMENT REPORT.

17. The positioning system of claim 15, wherein said information included in the measurement result information element comprises one or more of:
   a power value indicative of a radio head transmit power, Prh, and
   an uplink transmit power value P_ul_mcd indicating the transmit power of an uplink signal transmitted by the MCD.

18. The positioning system of claim 14, wherein the positioning node is further adapted to: i) receive a second message transmitted by the MCD, said second message comprising a received power value indicating a received power of a downlink signal transmitted by the serving radio head as measured by the MCD (P_dl_mcd) and ii) use said the set of parameters received from the serving base station and said P_dl_mcd to calculate the cable loss value.

19. The positioning system of claim 17, wherein the set of parameters further comprise:
   an amplifier gain value, G_amp, and
   a downlink path loss value, L_dl.

20. The positioning system of claim 14, wherein
   determining the cable length value using the calculated cable loss value comprises selecting at least one predetermined cable length value using the calculated cable loss value.

21. The positioning system of claim 14, wherein the set of parameters further comprises:
   a power value indicating a received power of a downlink signal transmitted by the serving base station as measured by the MCD (P_dl_mcd).

22. The positioning system of claim 14, wherein the obtained location information comprises one or more of i) a set of polygon coordinate vectors and ii) a set of coordinates derived from the set of polygon coordinate vectors.

23. The positioning system of claim 22, wherein the positioning system is further adapted to form a fingerprint using the determined cable length value and use the formed fingerprint to obtain the location information for the MCD.

24. The positioning system of claim 14, wherein
   the location information comprises the set of polygon coordinate vectors, and
   the set of polygon coordinate vectors define a polygon and comprise at least three polygon coordinate vectors, each polygon coordinate vector comprising at least a first coordinate and a second coordinate.

25. The positioning system of claim 23, wherein
   the positioning system is further adapted to obtain one or more measured radio property values and form the fingerprint using both the determined cable length value and the one or more measured radio property values,
   the positioning system is further adapted to send to a database server a query for location information, the query comprising the fingerprint, and
   the database server is configured to use the fingerprint included in the query to lookup the location information in a database.

26. A method performed by a positioning system for determining the location of a mobile communication device (MCD), the method comprising:
   determining a cell in which the MCD is located, the determined cell being served by a serving base station connected to a set of two or more radio heads, wherein each one of the radio heads included in the set of radio heads is connected to the serving base station via a cable having a length;
   calculating, based on one or more signal measurements, a cable loss value (L_cable) indicative of the length of a cable connecting the serving base station to a radio head serving the MCD;
   using the calculated cable loss value, selecting a radio head identifier from a plurality of radio head identifiers, said selected radio head identifier identifying one of said radio heads included in said set of two or more radio heads;

using the selected radio head identifier, obtaining location information for the MCD.

* * * * *